United States Patent Office 3,338,147
Patented Aug. 29, 1967

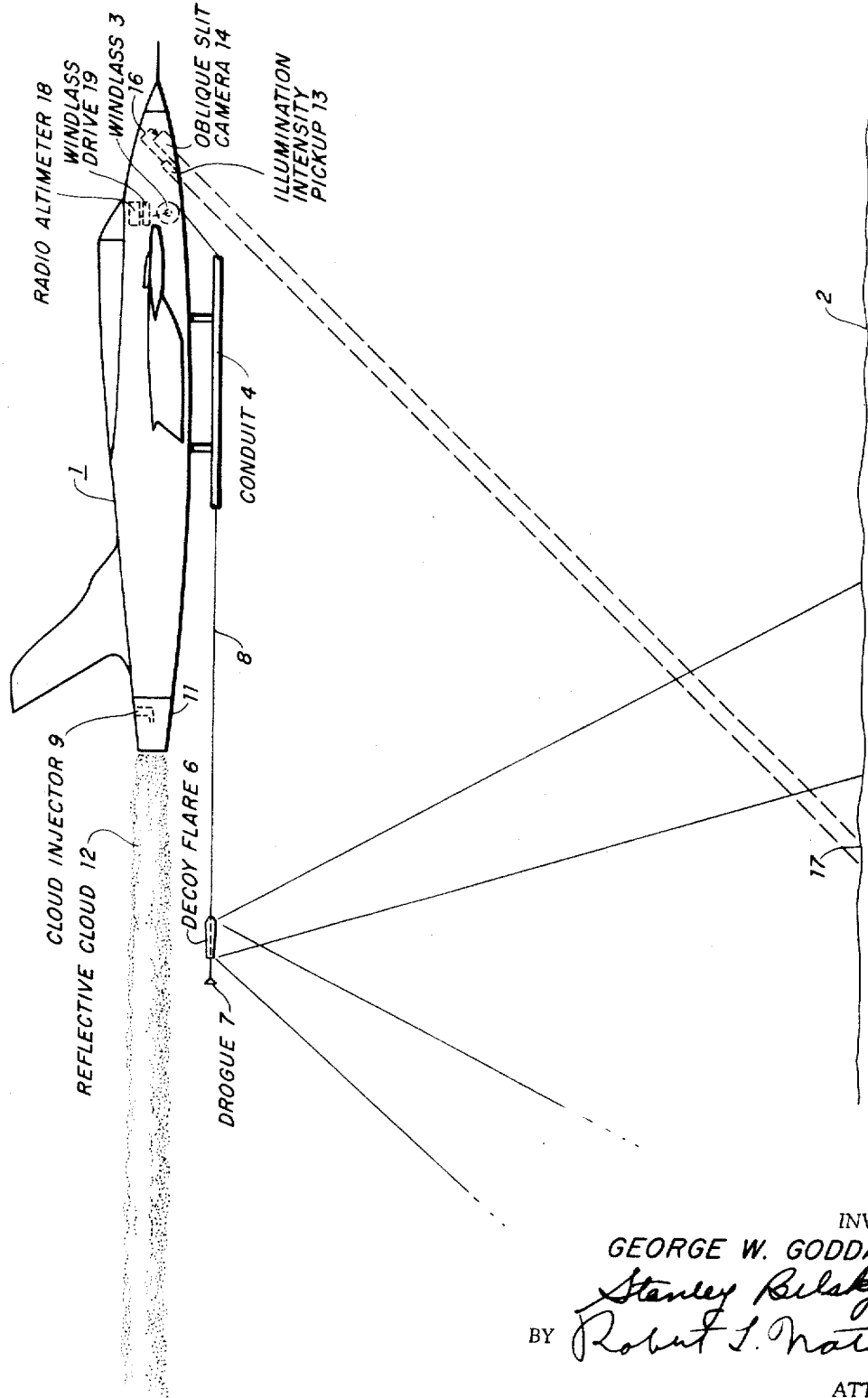

3,338,147
METHOD OF ILLUMINATING AREAS VIEWED FROM AN AIRCRAFT AT NIGHT
George William Goddard, Chevy Chase, Md., assignor to Itek Corporation, Lexington, Mass., a corporation of Delaware
Filed Sept. 10, 1965, Ser. No. 486,496
6 Claims. (Cl. 95—12.5)

ABSTRACT OF THE DISCLOSURE

This disclosure illustrates a method for illuminating relatively dark areas under an aircraft by employing a flare towed by the aircraft and positioned under a smoke canopy generated by the aircraft, which canopy is utilized as a reflector.

---

The present invention relates to methods of illuminating ground areas viewed from an aircraft at night.

In the prior art methods, high speed jet aircraft flying at low altitudes must eject at least three or four cartridges per second. It is not possible to obtain accurate fusing of the cartridges at these high speeds and as the speeds are progressively increased, the problem becomes more involved. Furthermore, the flash cartridge method presented an additional danger from falling duds. This was so serious that the Services issued an order banning their use on peacetime military maneuvers with the ground forces. This ban deprived our military commanders of the use of valuable military training exercises. The use of flash bombs, cartridges and strobe lights require operation within a given altitude range. This has always been a great drawback where reconnaissance aircraft are operating over rolling terrain. Frequently the tops of mountains and hills are properly exposed but the adjacent valleys are underexposed. Similarly, dark pine tree areas are underexposed with respect to light, sandy beaches.

In the prior art night aerial photographic methods it is necessary to make sequence pictures, one picture per flash, with an exposure measured in small fractions of a second; typically one five hundreth of a second. The problem of synchronizing the short intervals of light radiation produced by the strobe lights, or fused cartridges, with the short exposure intervals, has been acute. It is far more desirable to utilize a constant powerful illumination source in conjunction with longer exposure intervals associated with fast film so as to provide for photography at higher altitudes. The use of constant illumination further enables the pilot to fly the aircraft directly over the target or obtain valuable reconnaissance information which may be utilized either with or without photography.

Accordingly, it is the principal object of the present invention to provide a novel method of illuminating ground areas viewed from an aircraft at night.

It is a further object of the present invention to provide a novel method of providing constant illumination of ground areas viewed from an aircraft at night which eliminates synchronization problems between the prior art actuation of the aforesaid fused cartridges, flash bombs and strobe lights and the short exposure intervals of sequentially exposed photographic film.

It is a further object of the present invention to provide a novel method of night-time ground illumination which eliminates the danger of falling duds involved in the use of flash cartridges during night military maneuvers.

It is a further object of the present invention to provide a novel method of night-time illumination of ground areas which provides for the employment of relatively long exposure times of the film to enable night photography up to and above twenty thousand feet with fast film and high quality image motion compensation.

It is yet a further object of the present invention to provide a novel night-time illumination method which provides for constant illumination of ground areas to permit a change in the aircraft flight path to place the aircraft directly over the target.

It is yet a further object of the present invention to provide a method of effectively carrying out visual observation of ground areas from an aircraft at night.

It is yet a further object of the present invention to provide a method of night photography which tends to eliminate underexposed areas such as valleys or forests photographed in accordance with prior art systems.

It is still yet a further object of the present invention to provide a method of night illumination of ground areas from aircraft which, additionally, provides a decoy for infrared seeking anti-aircraft rockets or projectiles.

Other objects and advantages of the present invention will become apparent as the following description taken in conjunction with the figure proceeds.

In accordance with the present invention a decoy flare is towed by an aircraft which is viewing or photographing ground areas at night. A reflective smoke is emitted by the aircraft to form a reflective canopy over the burning flare. Some portions of the intense light emitted by the flare are reflected off of the canopy and are redirected at the viewed areas while other portions of the light directly illuminate the ground areas.

In the figure, an aircraft 1 is flying over ground area 2 as indicated. A cable windlass 3 is positioned within the aircraft and is associated with cable conduit 4 which is shown exterior to the aircraft, but which could be mounted therein. When it is desired to view or photograph ground area 2 at night, decoy flare 6 is propelled out of conduit 4 and windlass 3 is rotated to let out cable 8. Drogue 7 is mounted to decoy flare 6 so as to properly maintain tension within cable 8 to keep it in the proper position. Windlass 3 continues to rotate until decoy flare 6 is typically five hundred feet from the tail of the aircraft. Cloud injector 9 is positioned in tailpipe 11 aft of the aircraft and causes a broad reflective cloud layer to be produced. Titanium tetrachloride, which forms a dense white cloud, is satisfactory. The reflective layer will have fanned out sufficiently to form a large reflective canopy above towed decoy flare 6 and, accordingly, a large portion of the light radiated by the burning flare 6 will be reflected off of layer 12 and will be redirected at ground area 2, while a large portion of the radiated light will directly impinge upon ground area 2. Decoy flare 6 may be fused by means of an electrical cable (not shown) entwined about cable 8, or may be otherwise ignited by radio or any other means well known to those skilled in the art. A high temperature resistant section of cable 8 passes through flare 6 to maintain drogue 7 in position during the burning of the flare. In the alternative, drogue 7 may be positioned ahead of flare 6 upon cable 8. An optical periscope, not shown, may be mounted in the nose of aircraft 1 to provide for pilot observation of the illuminated area of ground area 2. Illumination intensity pickup system 13 may be mounted, as shown, in the nose of aircraft 1, and is coupled to oblique slit camera 14 as schematically illustrated by dotted line 16. The line of sight of the illumination intensity pickup system 13 and camera 16 is positioned such that a forward portion 17 of illuminated ground area 2 is optically viewed. The width of the slits of camera 14 are adjusted in inverse proportion to the illumination intensity of illuminated area 17 viewed by the pickup system 13. If the illumination intensity is relatively low, the slits are widened to increase the total exposure of the film in camera 14, while on the other hand, if the measured illumination intensity should be quite high, the slit width is reduced. For further details of this arrangement see my copending patent application No. 275,875, filed Apr. 26, 1963 and assigned to the same assignee as the present invention. Since oblique slit cameras with their associated image motion compensation mechanisms are well known to those skilled in the art, details thereof will not be disclosed in the interest of clarity. When it is desired to photograph at altitudes in the neighborhood of 20,000 ft., the total exposure is increased by slowing down the film velocity past the focal plane slits and by widening the slits. In order to provide for uniform exposure, the slits may be made relatively narrow at their "nadir" portions and wider at their "end" portions to correspond to the illumination intensity pattern produced on the ground by the flare.

When the towed flare 6 is a considerable distance from the tail of the aircraft, infrared sensing projectiles will be attracted toward the intense heat emitted by flare 6 so that the flare, additionally, acts as a decoy for such anti-aircraft missiles. It may well be desirable to use larger flares for higher altitudes. For that matter, a multiplicity of towed flares may be utilized at higher altitudes to increase the ground illumination and/or to increase the decoy effect of flare 6 with respect to infrared seeking rockets or projectiles.

The flare will be positioned 50 to 500 feet or more from the tail of the aircraft. It is often desirable in making aerial photographs to maintain ground object shadow lengths constant with increasing altitudes. Accordingly, raio altimeter 18 produces a signal which controls windlass drive system 19 to in turn let out more cable where the altitude is increasing, and to bring in cable where the altitude is decreasing. On the other hand, it is sometimes desirable to obliquely illuminate the ground if the pilot is looking for certain targets such as radar towers, since the resulting long shadows aid in photographic reconnaissance. Under these circumstances more cable may be manually let out by the actuation of windlass 3.

While the invention is best exemplified by conventional aircraft environments, it should be understood that the word "aircraft" includes craft for traveling through outer space. It is conceivable, for instance, to utilize my invention for photographing the surface of a planet. The word "cloud" is intended to define a suspension of finely divided particles of a solid or liquid in air or in outer space.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:
1. A method of photographing surface areas under night-like conditions comprising the steps of:
   flying an aircraft over said areas;
   towing a burning flare behind said aircraft;
   generating a reflective cloud behind said aircraft to produce a reflective canopy above said burning flare; and
   photographing said areas illuminated thereby from said aircraft.
2. The method as set forth in claim 1 wherein said flare is towed at a distance behind said aircraft which provides for photographing the illuminated areas from said aircraft while on the other hand allowing said flare to act as an effective decoy for anti-aircraft devices.
3. The method as set forth in claim 1 further including the steps of:
   determining the altitude of said aircraft; and
   varying the distance of said flare from said aircraft in response to changes in altitude determinations to maintain ground object shadow lengths substantially constant.
4. A method of illuminating surface areas under night-like conditions comprising the steps of:
   flying an aircraft over said areas;
   causing a light illumination source to move along with and apart from said aircraft; and
   generating a light reflective cloud canopy above said light illumination source so that light emitted by said source is reflected back toward said areas.
5. The method of claim 4 wherein said light reflective cloud is generated behind said aircraft.
6. The method of claim 5 further including the step of photographing the illuminated areas from said aircraft.

References Cited

UNITED STATES PATENTS

| | | | |
|---|---|---|---|
| 1,173,515 | 2/1916 | Holt | 102—35 |
| 1,442,929 | 1/1923 | Elia | 102—35 |
| 2,895,393 | 7/1959 | Goddard | 95—12.5 |

JOHN M. HORAN, *Primary Examiner.*